United States Patent [19]

Caples et al.

[11] 4,291,410
[45] Sep. 22, 1981

[54] MULTIPATH DIVERSITY SPREAD SPECTRUM RECEIVER

[75] Inventors: Edgar L. Caples, Garland; Robert K. Marston, Plano; Khalil E. Massad, Richardson, all of Tex.

[73] Assignee: Rockwell International Corporation, El Segundo, Calif.

[21] Appl. No.: 87,910

[22] Filed: Oct. 24, 1979

[51] Int. Cl.³ .................... H04B 1/12; H04J 13/00
[52] U.S. Cl. ........................................ 375/1; 329/122; 375/98
[58] Field of Search .............. 375/1, 14, 98; 455/138; 329/122; 328/168

[56] References Cited

U.S. PATENT DOCUMENTS

| | | | |
|---|---|---|---|
| 3,646,448 | 2/1972 | Harmon, Jr. et al. | 375/98 |
| 3,794,921 | 2/1974 | Unkauf | 375/14 |
| 3,944,942 | 3/1976 | Chudleigh, Jr. | 328/168 |
| 4,048,563 | 9/1977 | Osborne | 375/1 |
| 4,071,829 | 1/1978 | Davis et al. | 375/98 |
| 4,099,124 | 7/1978 | Sharpe et al. | 375/98 |
| 4,112,370 | 9/1978 | Monsen | 375/14 |
| 4,164,628 | 8/1979 | Ward et al. | 375/1 |

*Primary Examiner*—Donald J. Yusko
*Attorney, Agent, or Firm*—Richard K. Robinson; Howard R. Greenberg; H. Fredrick Hamann

[57] ABSTRACT

A multipath diversity spread spectrum communications receiver will enhance system performance over communication channels with distortion caused by multipath and fading effects. The multipath diversity receiver utilizes decision directed coherent integration with post detection correlation techniques for performance enhancement. The receiver also incorporates a fast attack, fast release automatic gain control to process noncontinuous wideband spread spectrum signals which are subject to fading and multipath effects.

13 Claims, 6 Drawing Figures

MULTIPATH DIVERSITY SPREAD SPECTRUM RECEIVER

BACKGROUND OF THE INVENTION

This invention relates to multipath diversity spread spectrum receivers. The Government has rights in this invention pursuant to Contract No. DAHC15-73-C-0192 awarded by the Department of the Army.

The propagation characteristics of radio signals are generally very problematic, especially at UHF frequencies, and even more so when either the transmitter, receiver or both transmitter and receiver are part of a mobile communication system operating in a highly urbanized area. In addition to the path attenuation which is in excess of the free space attenuation, the communication link is characterized by multiple propagation paths between the transmitter and the receiver. The multipaths arise from buildings and other structures in the vicinity of the receiver which scatter the signal energy. These multipaths, which can cause differences in the arrival time at the receiver of signals propagating along the paths, are responsible for the upper limits of performance of the communication systems and especially so if the system is a digital communication system.

At a given point in space, the plane waves resulting from the multipaths may be added constructively or destructively to produce a composite signal. When the plane waves are added destructively, the communications signal can experience fades of 20 decibels (dB) or greater with respect to the root mean square (RMS) level. The fact that these fades occur roughly every half-wave length of the radio frequency (RF) is of equal importance. Thus, burst mode operated mobile radios that operate at microwave frequencies encounter fades every few inches of the incident plane wave of the mobile radio. This fading has been shown both analytically and experimentally to approximate the Rayleigh probability distribution.

Significant multipath time delays cause symbol or bit distortion and intersymbol interference. Multipath distortions spread the received signal energy over time. Intersymbol interference occurs when a symbol is overlapped by the delayed components of an adjacent symbol. Such interference for some modulation techniques can lead to irreducible symbol error probabilities which cannot be improved by increasing the received signal-to-noise ratio.

One method of reducing multipath effects was disclosed in U.S. Pat. No. 3,794,921, in which a differentially adapted receiver is described that would receive phase coded pulses transmitted in such a way that the respective multipath contributions are separated at the receiver. The receiver is differentially adapted and derives a reference signal that has the same complex envelope as the incoming signal. The reference signal is derived from the digital data decision made on the incoming signal, which is recirculated and combined with the delayed input to inverse modulate the incoming signals, thereby providing only the signal envelope which is an optimum coherent reference for a matched filter. Decision feedback is employed to allow coherent phase shift key detections without channelizing filters. The receiver could be employed in both binary and four phase modulation systems.

The prior art system described above was limited to non-spread spectrum coherent signals and used peak detecting oriented type automatic gain controls. The delay lines operated in the intermediate range and, as such, were required to be very precise. The synchronization of the prior art system was very complex due to the phase stability requirements.

SUMMARY OF THE INVENTION

A spread spectrum communication receiver will enhance data detection performance over distorted communication channels and multipath environments. A fast attack, fast release, automatic gain control enables the receiver to receive noncontinuous wideband spread spectrum signals which are subject to fading and multipath effects.

The multipath diversity spread spectrum receiver can be employed to detect and decode coherent and noncoherent spread spectrum transmissions with phase shift keyed coded data and multilevel phase states (2,4,8, etc.) in various chip weighting schemes including Minimum Shift Keyed (MSK), cosine squared ($\cos^2$) and window functions.

The diversity spread spectrum receiver provides for detecting the spread spectrum signal with a detector that corresponds to the various data codes and chip weighting schemes. The signal detector will provide a pulse each time that a data symbol, such as a data bit, is detected. The detected symbol, as represented by a pulse such as a correlation pulse, is applied to a Decision Directed or $D^2$ coherent integrator which can develop the Automatic Gain Control (AGC) signal, as well as provide a synchronization signal and provides an enhanced reference signal for post detection, multiplication and integration, i.e. correlation. The data detector, in conjunction with the received signal and the enhanced reference signal, decodes the data. The automatic gain control signal generated during the coherent integration process is applied to an input amplifier to ensure that the received signal is maintained at a predetermined level throughout the receiver chain.

The functions discussed above can be implemented with the use of large scale integration (LSI) digital circuits, charge transfer devices, charge coupled devices and/or surface wave acoustic devices.

Many advantages of the present invention may be ascertained from a reading of the specification and claims in conjunction with the drawings.

DETAILED DESCRIPTION OF THE PREFERRED EMBODIMENT

A spread spectrum system is one in which the RF communication signal utilizes more bandwidth than necessary to carry the required information. There are two principle types of spread spectrum systems, frequency hopping and direct sequence pseudorandom encoding. Both these systems can provide some measure of protection from interfering signals and multipath effects. Pseudorandom (PN) sequence, sometimes called direct sequence, is a well-known and widely used spread spectrum signaling method. The basic form of a pseudorandom signal is that produced by a pseudorandomly modulated phase shift keyed carrier. During modulation, each symbol of information is data modulated (±1 in binary modulation) and modulo 2 added to a pseudorandom chip sequence which chip modulates the RF carrier whose phase is modulated according to the output of a pseudorandom sequence generator. The chip rate $R_c$ is much greater than the data rate. Although in the discussion, phase shift keying is mentioned, the characteristics of pseudonoise spread spectrum can be achieved by other pseudorandomly angle modulated RF carriers. Fundamental to the pseudorandom modulation is the concept of bandwidth spreading. The processing gain of a spread spectrum receiver, such as that shown in FIG. 1, is equal to $T_sW$ where $T_s$ is the information symbol time and W is the spread spectrum bandwidth.

Further details of spread spectrum communications may be obtained from copending application entitled "Single Sideband Signal Demodulator", Ser. No. 919,021, filed on July 6, 1978 and assigned to the assignee of the present invention.

Figure 1:
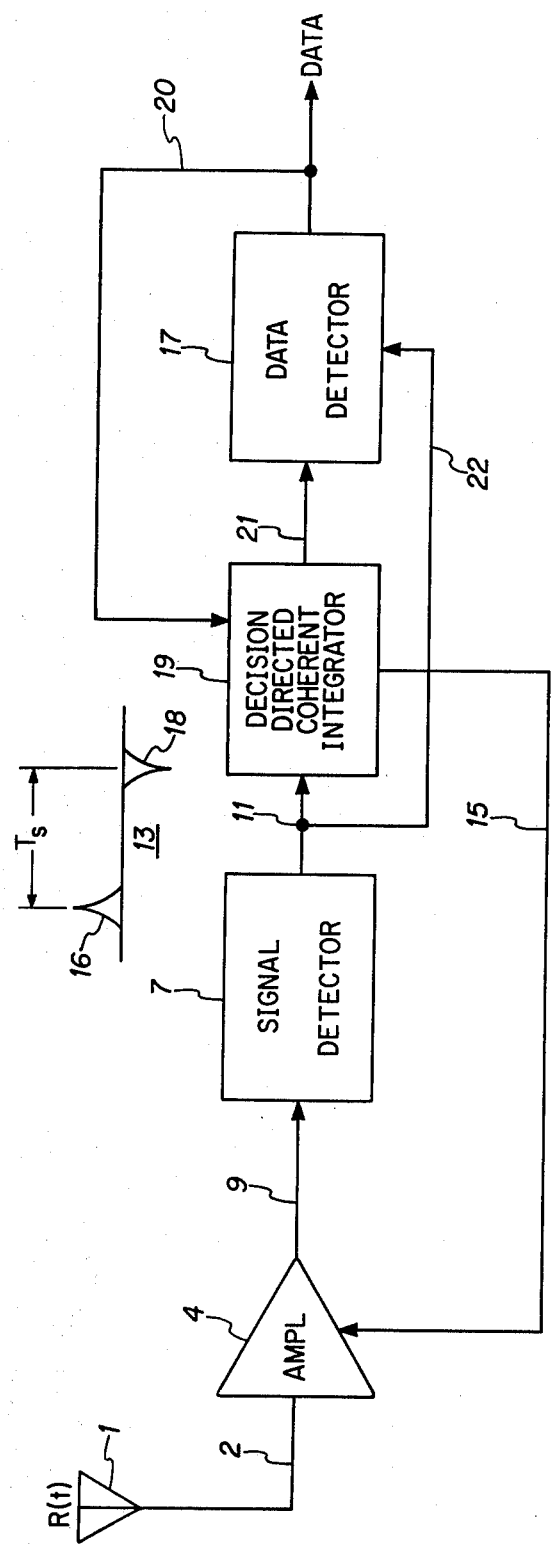
FIG. 1 is a multipath diversity spread spectrum receiver.

FIG. 1, to which reference should now be made, is a block diagram of a spread spectrum receiver which can be implemented as a pseudorandom spread spectrum receiver. The incoming signal R(t), which can be a spread spectrum signal or a pseudorandom spread spectrum signal, is detected by the antenna 1 and applied to amplifier 4 by means of conductor 2. The amplifier 4 amplifies the received signal to a sufficient level for processing by the signal detector 7 which is connected to the amplifier 4 by means of conductor 9. In the case as shown in FIG. 1, the receiver has an automatic gain control system incorporated therein and the input amplifier 4 is a variable gain amplifier. The gain of the amplifier can be varied by using a programmable gain amplifier where there is a variable signal attenuation provided in the feedback loop, or the gain can be varied by attenuation of the input signal or by attenuation of the output signal.

The signal detector 7 is a matched filter detector, such as that disclosed in copending application entitled "Baseband Differentially Phase Encoded Radio Signal", Ser. No. 968,069, filed Dec. 11, 1978 having a common assignee with this invention.

The output of signal detector 7 is represented by waveform 13. A "+1" indicated by pulse 16 of waveform 13 will be decoded by the signal detector if the correlation is positive, or a "−1" will be decoded as indicated by pulse 18 of waveform 13 if the correlation is negative. The baseband information is present at node 11 and represented by waveform 13.

The pulses as represented by waveform 13 are applied to the Decision Directed or ($D^2$) coherent integrator 19 which multiplies the signal from the signal detector with the previously decoded data, and coherently integrates the product providing an integrated signal on conductor 21 for data detection. The automatic gain control signal used to control the gain of the amplifier 4 is provided from the coherent integrator by conductor 15.

The integrated signal that is present on conductor 21 is applied to the data detector 17 which provides the output data on conductor 20. The data detector combines the signal that is present at point 11, which is conducted to the data detector by conductor 22, with the output of the coherent integrator 19, that is applied to the data detector 17 by conductor 21. The decoded data is fed back into the coherent integrator by means of conductor 20.

Figure 2:
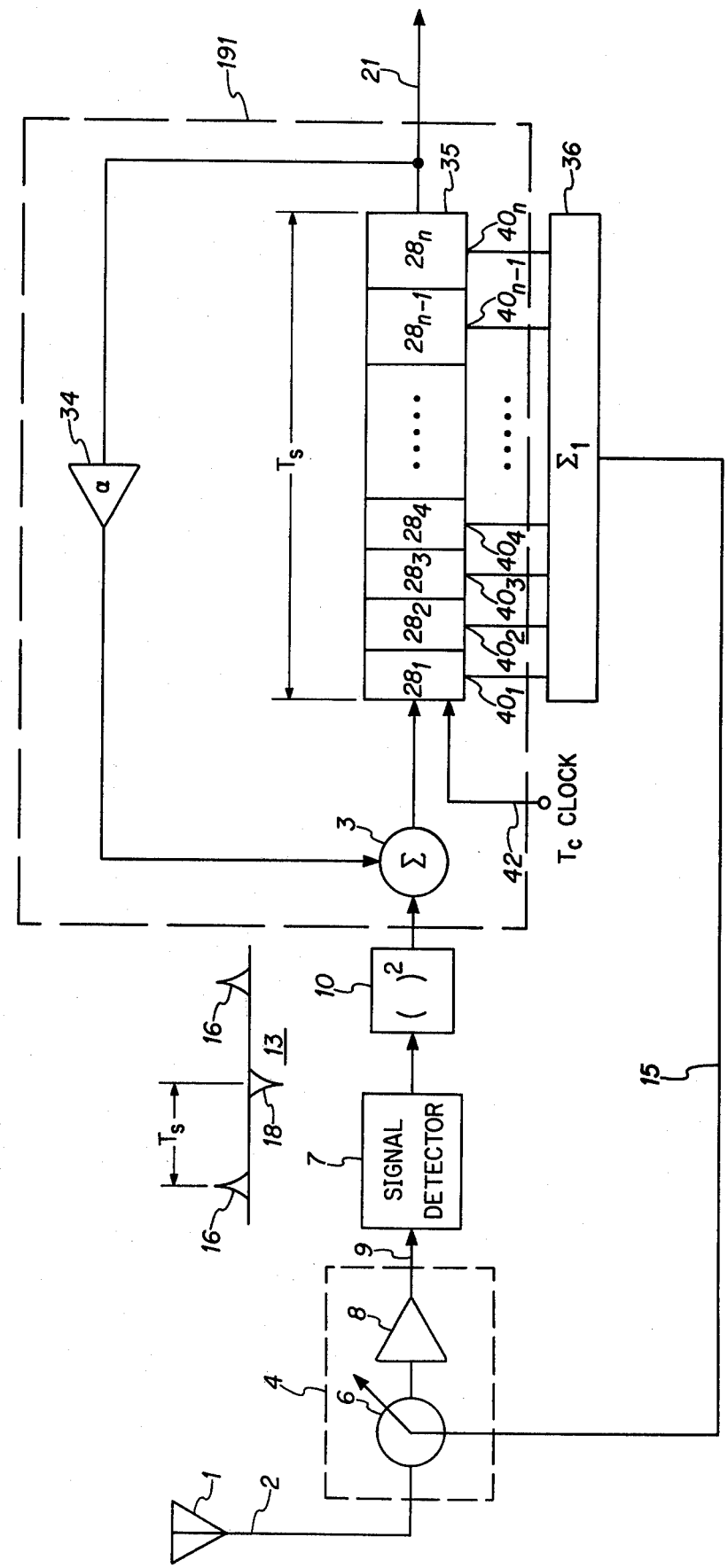
FIG. 2 is a functional block diagram of an automatic gain control circuit that can be used with the receiver of FIG. 1.

FIG. 2, to which reference can now be made, is a functional block diagram of an automatic gain control circuit that can be used with the receiver of FIG. 1. The receive signal R(t) is detected by antenna 1 and applied to amplifier 4 by means of conductor 2. Amplifier 4 is a gain controllable amplifier that has an attenuator 6 in the input circuit followed by an amplifier stage 8 on the output circuit. The output of the input amplifier 4 is applied to the signal detector 7 by conductor 9. As discussed earlier, the detector 7 may be a matched filter detector. It provides a string of pulses that is represented by waveform 13 that are separated by one symbol time at the input to the squaring device 10. The detector provides both positive and negative pulses which relate to the data transmitted. To ensure that the pulses applied to the coherent integrator 191 are of the same polarity, there is a polarity normalizing device or squaring device 10, which can also be a decision directed feedback device, as will be discussed later, which normalizes the polarity of the pulses that appear at the input of the summing device 3, which is part of the coherent integrator 191. The coherent integrator 191 is part of the Decision Directed coherent integrator 19 of FIG. 1. The integrated output is applied to feedback line 15 for controlling the controllable gain amplifier 4 by varying the attenuation of the input signal by attenuator 6.

The coherent integrator as shown in FIG. 2 utilizes sample data techniques and includes the summing device 3 that is placed in cascade arrangement between the polarity normalizing device 10 and the charge transfer device or charge coupled device 35. The output of the squaring device 10 is applied to the summing device 3, where it is combined with the coherent integrated signal feedback which is the signal present on conductor 21 multiplied by an amplifying factor of $\alpha$ by amplifier 34. The integrator 19 consists of a charge transfer device or charge coupled device, that has a plurality of storage cells $28_l$ through $28_n$, with each storage cell having a parallel output terminal $40_l$ through $40_n$. The number of storage cells is a predetermined number that is based upon the number of chips per symbol K and the number of samples taken per chip by the sampling signal that is provided to the integrator on conductor 42 and represented by $T_c$ CLOCK. The parallel outputs of the charge transfer device or charge coupled device $40_l$ through $40_n$ are summed by summing bus 36 with the resulting summation being applied, as mentioned earlier, as feedback by conductor 15 to the variable gain controlled amplifier 4, that includes a constant gain amplifier 8 whose input is adjusted by the current controlled attenuator 6.

The output of the charge transfer device 35 from the last cell $28_n$ is applied to amplifier 34. The gain of amplifier 34, as well as the response of the automatic gain controlled circuit, is determined by the feedback constant $\alpha$ of amplifier 34 where $\alpha$ must be between 0 and 1. The fastest attack time is achieved when $\alpha = 0$. If the receive signal is subject to fading, it may be desired to ride out fast fading by choosing $\alpha<1$. For $\alpha<1$, the charge transfer device 35 with positive feedback, functions as a coherent integrator. The signal that is fed back is added coherently with the next arriving pulse by the summing device 3 thereby causing the signal to build up inside the coherent integrator loop that consists of the charge transfer device 35, the amplifier 34 and the summing device 3.

Because the output of the signal detector 7 can either be positive or negative as shown at 13 of FIG. 2, it is necessary to normalize the polarity of the signal prior to integration by the coherent integrator 191. In FIG. 2, the polarity of the output of signal detector 7 is normalized by implementing a squaring function or absolute function.

Figure 3:
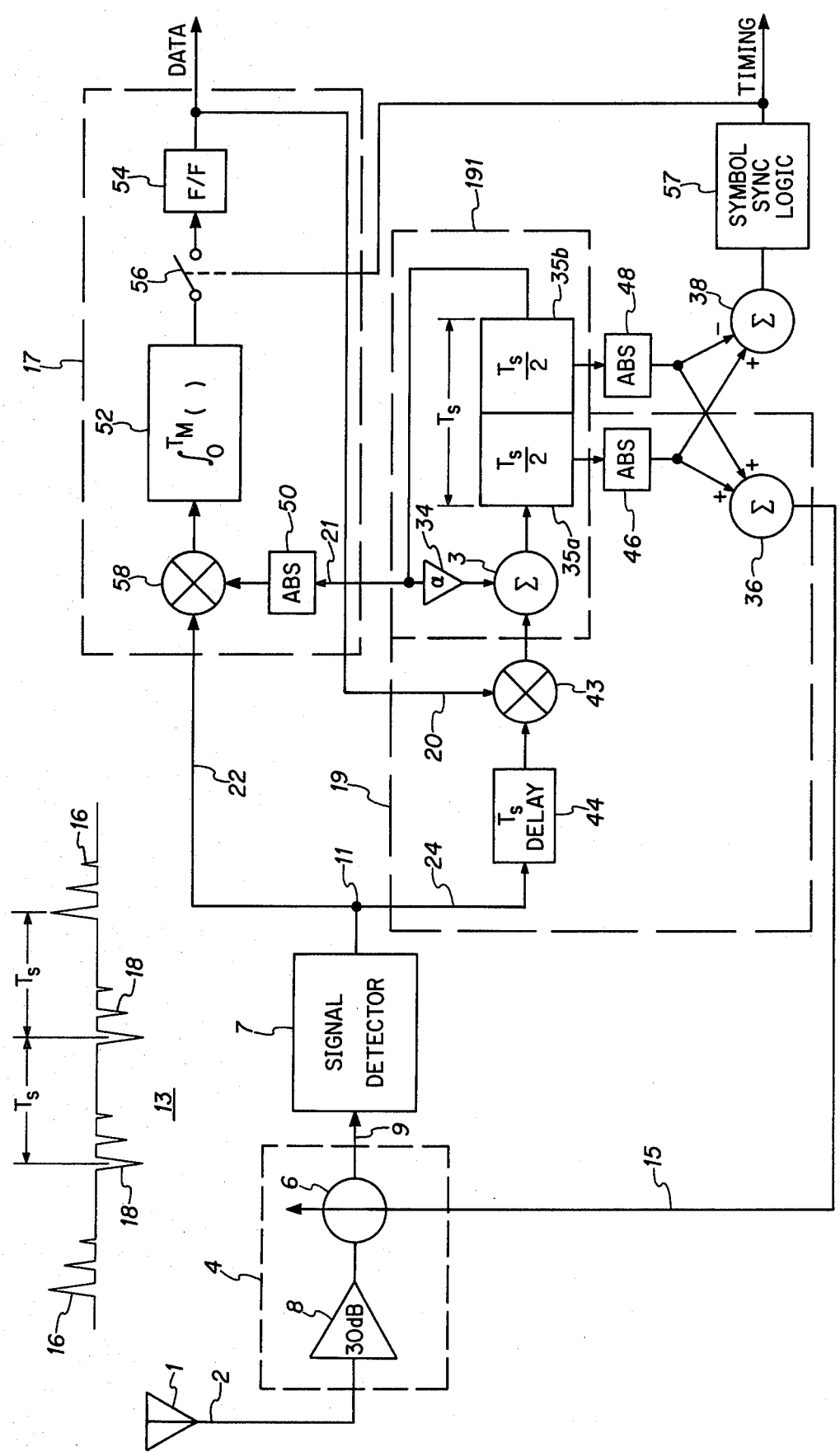
FIG. 3 is a detailed block diagram of the receiver of FIG. 1 including the automatic gain control circuit.

In FIG. 3, to which reference should now be made, the output signal of the detector 7 is normalized by data decision directed feedback which includes two branches that are split off at node 11 and includes conductors 22 and 24. The detected data that is present on conductor 20 is multipled with the output of the signal detector, represented by waveform 13 which is a multipath signal that is present at node 11 after being passed through a delay device 44, by multiplier 43 prior to being applied to the coherent integrator 191. The signal that is also present at node 11 is applied to data detector circuit 17 that includes a multiplier 58, an integrate and dump device 52, a symbol timing switch 56 and an output flip-flop 54. The multiplier 58 multiplies a signal that is present on the conductor 22 with the output of the coherent integrator 191. The squaring device or absolute device 50 is used to ensure the proper polarity of the signals to the multiplier 58, however, it has been found that this device is only necessary during the receipt of the first symbol. The output of the multiplier 58 is applied to the integrate and dump device 52 which operates as a filter operating over a multipath time delay spread $T_M$ and is used for narrow-band filtering. At the output of the integrate and dump filter, only $1/T_s$ of the total interference power spectrum bandwidth W appears as the noise power, giving rise to the factor $(T_sW)$ as the processing gain against a narrow-band jammer and uncorrelated pseudorandom signals. The output of the data detector 17 is synchronized by switch 56 by a signal that is generated by the symbol sync logic device 57, which also can develop timing for the remainder of the receiver.

The operation of the coherent integrator 191 is similar to that discussed in conjunction with FIG. 2, however, as discussed earlier, the input normalizing function uses a data decision directed feedback and provides for applying the signal that is present at node 11 to the delay line 44, that provides a delay of one symbol by means of conductor 24. The output of the delay line is applied to multiplier 43 where it is multiplied with the detected data that is provided on conductor 20. This data decision feedback circuit essentially normalizes the pulse for summation by summing device 3 after which it is applied to the charge coupled device or charge transfer device 35.

The output of the charge transfer device is summed by summing device 36, after obtaining the absolute value of the sum of the contents of each individual storage cell that is present in charge transfer device or charge coupled device and applied to feedback line 15 for controlling the current control attenuator 6, which in the embodiment of FIG. 3, follows the constant gain amplifier 8.

To ensure the proper synchronization of the data, the symbol sync logic circuit 57 obtains the difference of ½ of the sum of the contents of the charge transfer device 35 from that of the other half and uses the difference to generate a single synchronization signal. As shown in FIG. 3, the charge transfer device 35 is divided into two equal segments 35a and 35b each having $T_s/2$ delay. Summing device 38 obtains the difference between the first half and the second half of the pulses stored within the charge transfer device and applies it to the symbol synchronization logic 57. The output of the symbol synchronization logic 57 provides the timing signal that is used through the remainder of the receiver and is also used to control the synchronization switch 56.

Figure 4:
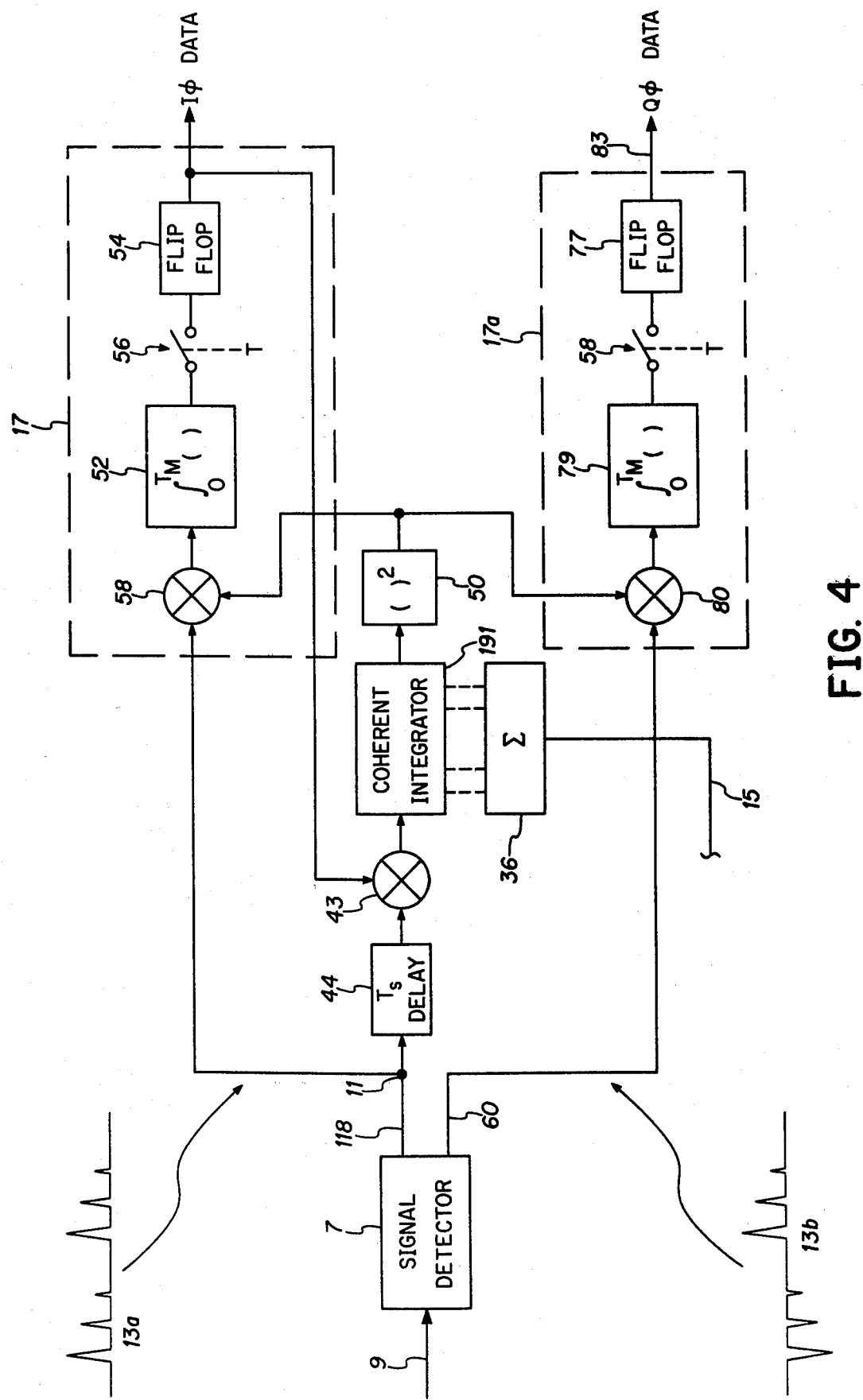
FIG. 4 is a spread spectrum receiver for providing multilevel phase reception.

FIG. 4 provides for the situation where there is a four phase signal transmitted and shows it is possible to expand the receiver of FIG. 1 to include detecting of both inphase and quadrature phase data. The signal detector 7 can be a device such as that disclosed in the above referenced copending application, and provides the inphase detected signal at node 11, the waveform of which is 13a, which is a waveform diagram of a multipath spread spectrum signal and a quadrature channel signal on conductor 60 represented by waveform 13b. The signal at node point 11 is processed through the delay line 44, the multiplier 43, as well as the coherent integrator 191, which provides the automatic gain control signal on conductor 15 after summing the contents of the individual storage cells within the charge transfer device 35a by summing device 36.

When the transmitted waveform employs spread spectrum modulation techniques, the distorted signal will be received by the receiver, converted to IF frequency and forwarded on two channels, the inphase channel 118 and the quadrature phase channel 60 after being detected by a code matched filter in the signal detector 7. The envelope of the code matched filter output is at baseband. The envelope output forms the input to both the multipath coherent integrator 191 and the data detect circuit 17. In processing the received signal, the assumptions made on the channel characteristics are: the multipath components are quasi-stationary in time, that is, multipath fading is stationary over each symbol, but is independently Rayleigh fading from symbol to symbol. The circuitry of FIG. 4 employs decision directed feedback to control the polarity of the ± weighting factor to ensure that only positive signals are processed by the coherent integrator. The normalizing circuit function 50 is added to ensure that the output of the multipath coherent integrator will remain positive even if errors are made in data detection, especially during preamble processing. The multipath coherent integrator 191 in FIG. 4 consists of a positive feedback loop composed of a one symbol delay line and a loop gain $\alpha$ slightly less than unity as discussed in connection with FIG. 2. The successive multipath patterns add inphase and thereby build up as an average signal in accordance with the series $1+\alpha+\alpha^2+\ldots$ which is equal to $1/(1-\alpha)$. Additive noise is incoherent and builds up in power as $1+\alpha^2+\alpha^4+\ldots$ which equals to $1/(1-\alpha^2)$. The resulting signal-to-noise power output of the multipath coherent integrator is thus improved over the input by a factor of $$\frac{\left[\frac{1}{1-\alpha}\right]^2}{\frac{1}{1-\alpha^2}} \text{ which is equal to } \frac{1+\alpha}{1-\alpha}.$$

For example, if $\alpha$ is equal to 0.9, a 13 dB improvement in signal-to-noise results in the multipath coherent integrator output. This nearly noiseless reference is used to enhance the received waveform by multiplying the received signal with the multipath coherent integrator output.

It should be noted that the method described in conjunction with FIG. 3 for generating the automatic gain control signal, as well as the system timing pulses, can be incorporated into the embodiment shown in FIG. 4. The output of the coherent integrator 191 is applied to the squaring device 50 and then applied to the inphase data detector 17. In addition, the output of the squaring device 50 is also applied to the quadrature phase data detector 17a that includes the quadrature multiplier 80 where the signal is multiplied with the quadrature detected signal that is present on conductor 60 and applied to a quadrature integrate and dump device 79, which is used as a narrow-band filter for the quadrature signal, and to the symbol synchronization switch 58. The operation of the symbol synchronization switch is the same as that discussed in conjunction with switch 56. After synchronization, the quadrature integrator output 79 is sampled and applied to the quadrature phase flip-flop 77 and then the detected quadrature data is present on the output conductor 83.

Figure 5:
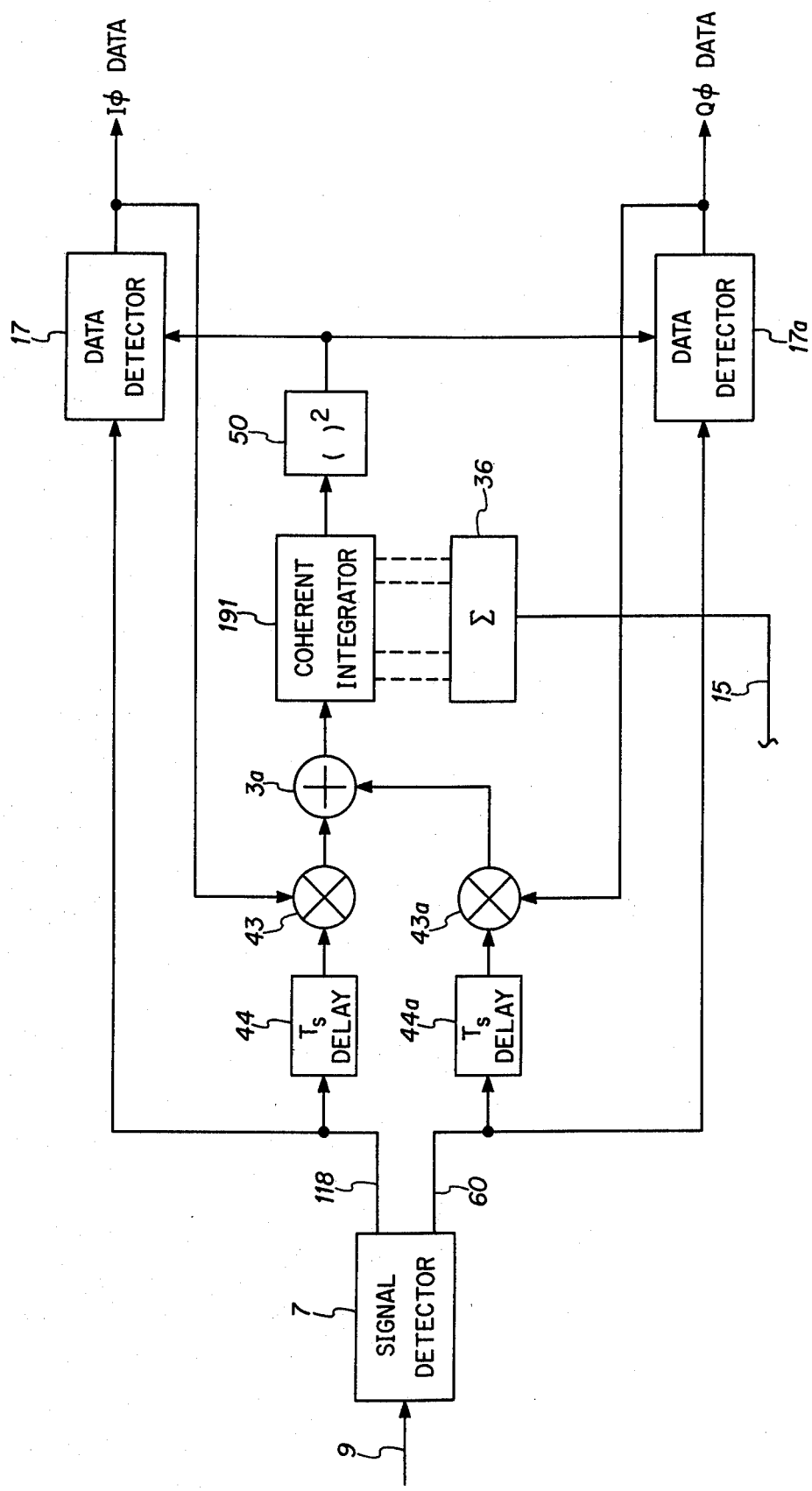
FIG. 5 is another embodiment of the spread spectrum receiver of FIG. 4.

An even greater improvement in the signal-to-noise ratio can be made as shown in FIG. 5 by the addition of a quadrature $T_s$ delay line 44a, a quadrature multiplier 43a and summing device 3a which sums the output of the multipliers 43 and 43a and applies the summation to the coherent integrator 191. The multiplier 43a in similar operation as multiplier 43, multiplies the quadrature data from the output of flip-flop 77 with the delayed pulses from the quadrature $T_s$ delay line 44a.

Figure 6:
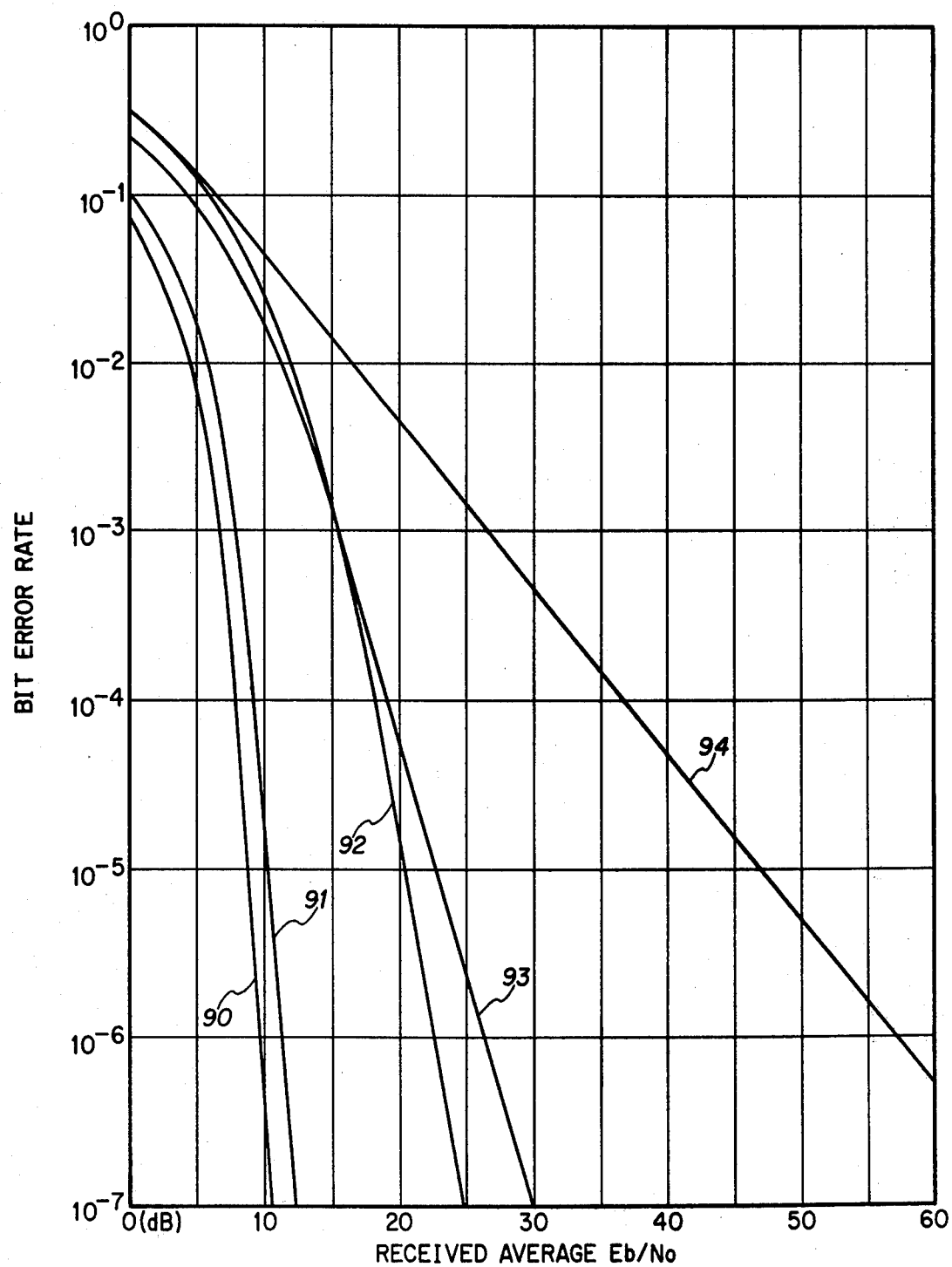
FIG. 6 is a graph comparing the performance of the spread spectrum receiver according to the invention with other types of receivers.

FIG. 6 is a graph that shows the performance comparison of the disclosed invention with the prior art systems. Curves 90 and 92 are obtained using the method of post detection correlation as disclosed in the preferred embodiment. Curve 90 is the optimum performance of the receiver in a line of sight operation where there is slow fading over a message interval, and curve 92 is the worst case performance of the receiver under rapid fading from symbol to symbol. Curve 93 represents prior art noncoherent receivers with message to message fading and peak selected detecting without post detection correlation, and curve 94 represents performance of a receiver that receives a signal that has symbol to symbol fading with no resolvable multipath components. Curve 91 is line of sight, no fading, no multipath and no post detection correlation. For example, to obtain a bit error rate of $10^{-5}$ in multipath fading environment the receiver operating by detecting the strongest received multipath component would require a received $E_b/N_o$ (where $E_b$ is equal to the signal energy per bit and $N_o/2$ is equal to the two sided noise spectral density) of 23 dB as illustrated by curve 93. However, by using the pose detection correlation techniques as described herein, curve 92 represents an upper limit of bit-error-rate (BER) performance while curve 90 represents a lower limit of BER performance. At $10^{-5}$ BER, the disclosed receiver provides performance improvements over prior art noncoherent receivers of 2.7 to 40 dB as illustrated in the comparisons of curves 90 and 92 with curves 93 and 94.

The multipath diversity processing concept, presented in FIG. 3 for binary PSK, can also be used for 4, 8 or even larger phase modulation. For example, in quadrature phase shift keying, the output of the multipath coherent integrator can be used to enhance, as shown in FIG. 4, the received signals in both the inphase and quadrature phase data channels prior to data detection.

Many changes and modifications in the above described embodiment of the invention can, of course, be carried out without departing from the scope thereof. Accordingly, the invention is intended to be limited only by the scope of the appended claims.

We claim:

1. A multipath diversity spread spectrum receiver for receiving spread spectrum signals, comprising:
    detector means for detecting the spread spectrum signals and to provide a stream of correlation pulses that relate to transmitted data;
    integrator means for decision directed coherent integrating the stream of correlation pulses including:
    normalizer means for normalizing the stream of correlation pulses to obtain a stream of normalized pulses,
    first summing means for summing each member of the stream of normalized pulses with a corresponding member of a stream of output pulses to obtain a stream of combination pulses,
    delay register means for delaying each member of the stream of combination pulses one symbol period to obtain the stream of output pulses, and
    feedback path means for connecting the stream of output pulses to the summing means; and
    first data detector means for decoding the transmitted data from the stream of output pulses to obtain a stream of detected data symbols.

2. The multipath diversity spread spectrum receiver for receiving spread spectrum signals according to claim 1, further comprising:
    means for automatically controlling the level of the spread spectrum signal.

3. The multipath diversity spread spectrum receiver for receiving spread spectrum signals according to claim 2, wherein the means for automatically controlling the signal level of the spread spectrum signal, comprises:
    controllable means for adjusting the signal level of the spread spectrum signal
    first absolute value means for obtaining a first absolute value of a first half of the contents of the delay register means;
    second absolute value means for obtaining a second absolute value of the contents of a second half of the delay register means; and
    second summing means for summing the first absolute value with the second absolute value to obtain therefrom a control signal for controlling the controllable means for adjusting the signal level of the spread spectrum signal plus noise.

4. The multipath diversity spread spectrum receiver for receiving spread spectrum signals according to claims 1 or 3 wherein the normalize means, comprises:

time delay means for delaying each member of the stream of correlation pulses one symbol period to obtain a stream of second pulses;

multiplier means for multiplying each member of the second pulses by a corresponding member of the detected data symbols to obtain a stream of third pulses; and third summing means for summing the stream of third pulses with a corresponding member of the output pulses to obtain the stream of normalized pulses.

5. The multipath diversity spread spectrum receiver for receiving spread spectrum signals according to claim 1, wherein the data detector means, comprises:

multiplier means for multiplying each output pulse with each correlator pulse to obtain a sixth pulse;

second integrator means for integrating the sixth pulse over a period $T_M$ to obtain a seventh pulse;

flip-flop means for sampling and storing the seventh pulse to obtain the detected data symbols.

6. The multipath diversity spread spectrum receiver for receiving spread spectrum signals according to claim 1 wherein the normalize means, comprises:

squaring means for squaring each member of the stream of correlation pulses to obtain the normalized pulses.

7. An automatic gain control apparatus for a radio receiver comprising, in cascade arrangement:

a variable gain controlled amplifier;

detector means for detecting a spread spectrum signal and to provide a stream of correlation pulses that relate to transmitted data;

integrator means for performing decision directed coherently integration or the stream of correlation pulses including;

normalizer means for normalizing the correlation pulses to obtain a stream of normalized pulses;

first summing means for summing the normalized pulses with a stream of output pulses to obtain a stream of combination pulses, delay register means for delaying the stream of combination pulses one symbol period to provide the stream of output pulses, and feedback path means for connecting the stream of output pulses to the summing means;

second summing means for performing a parallel summation of the contents of the delay register to obtain a first output signal; and means for connecting the first output signal to said variable gain controlled amplifier whereby the variable gain controlled amplifier adjusts its gain in response to the first output signal.

8. The automatic gain control apparatus according to claim 7 wherein the normalizer means comprises:

delay means for delaying each member of the stream of correlation pulses one symbol period to obtain a stream of second pulses;

multiplier means for multiplying each second pulse by a corresponding member of a stream of detected data symbols to obtain a stream of third pulses;

third summing means for summing the stream of third pulses with the stream of output pulses to obtain a stream of normalized pulses; and data detector means for converting each stream of output pulses to the stream of detected data symbols.

9. The automatic gain control device according to claim 7 wherein said delay register means, further comprises:

a multicelled charge transfer device having a clocked input, a signal input, a series output, and a plurality of parallel output terminals with each of said parallel output terminals being connected to a single cell of said multicell charge transfer device;

a fourth summing means electrically connected to said plurality of output terminals for summing of the information stored in each of said single cells;

a clock source electrically connected to said clock input terminal of said charge transfer device for periodically energizing said charge transfer device whereby the signal present on said input terminal is stored in a first cell of said charge transfer device and the information that is stored in each of said charge transfer cells is shifted one cell away from said input terminal.

10. The automatic gain control device according to claim 7 wherein said normalizer means includes a squaring device and said feedback path comprises:

amplifier means having a predetermined gain of $\alpha$ the output of which being electrically connected to the input of the first summing means with the input of said amplifier means being a delayed sample of said squaring means and having developed from said integrator means whereby said summing means sums the output of said squaring device means with a signal that is $\alpha$ times the output of said integrator means that occurs prior in time by a predetermined amount.

11. A method of automatically adjusting a signal plus noise, comprising:

controlling the gain of a variable gain amplifier with a subsequent generated error signal;

detecting the spread spectrum signals and providing a stream of correlation pulses that relate to transmitted data;

decision directed coherently integrating the stream of correlation pulses including the steps of:

normalizing the stream of correlation pulses to obtain a stream of normalizing pulses, summing each member of the stream of normalized pulses with a corresponding member of a stream of output pulses to obtain a stream of combination pulses, delaying each member of the stream of combination pulses one symbol period to obtain the stream of output pulses thereby, and decoding the transmitted data from the output pulses to obtain a stream of detected data symbols.

12. A multipath diversity spread spectrum receiver for receiving spread spectrum signals, comprising:

detector means for detecting the spread spectrum signals and to provide a first stream of correlation pulses and a second stream of correlation pulses that has a quadrature relationship with the first stream of correlation pulses and each stream of correlation pulses relates to transmitted data;

integrator means for decision directed coherently integrating the first stream of correlation pulses including:

first multiplier means for multiplying the first stream of correlation pulses with a first stream of data symbols to obtain a first stream of combination pulses, delay register means for delaying each member of the first stream of combination pulses one symbol period to provide a first stream of output pules, and normalizer means for normalizing the first stream of output pulses to obtain a stream of normalized pulses, first data detector means for decoding a first phase of transmitted data from the stream of normalized pulses and the first stream of correlation pulses to obtain a first stream of data symbols; and second data detector means for decoding a second phase of transmitted data from the stream of normalized pulses and the second stream of correlation pulses to obtain a second stream of data symbols.

13. A multipath diversity spread spectrum receiver for receiving spread spectrum signals, comprising:

detector means for detecting the spread spectrum signals and to provide a first stream of correlation pulses and a second stream of correlation pulses which has a quadrature relationship with the first stream of correlation pulses and each stream relates to the transmitted data;

integrator means for decision directed coherently integrating the first stream of correlation pulses including;

first time delay means for delaying the first stream of correlation pulses one symbol period to obtain a first stream of delayed pulses, first multiplier means for multiplying the first stream of delayed pulses with a first stream of data symbols to obtain a first stream of product pulses, second time delay means for delaying the second stream of correlation pulses one symbol period to obtain a second stream of delayed pulses, second multiplier means for multiplying the second stream of delayed pulses with a second stream of data symbols to obtain a second stream of product pulses, first summing means for summing the first stream of product pulses with the second stream of product pulses to obtain a stream of combination pulses, delay register means for delaying each member of the stream of combination pulses one symbol period to provide a stream of output pulses, and normalizer means for normalizing the first stream of output pulses to obtain a stream of normalized pulses;

first data detector means for decoding a first phase of transmitted data from the stream of normalized pulses and the first stream of correlation pulses to obtain a first stream of data symbols;

second detector means for decoding the second phase of transmitted data from the stream of normalized pulses and the second stream of correlation pulses to obtain a second stream of data symbols;

first feedback means for connecting the first stream of data symbols to the first multiplier means; and second feedback for connecting the second stream of data symbols to the second multiplier means.

* * * * *